United States Patent Office 3,558,770
Patented Jan. 26, 1971

3,558,770
WOUND TREATING COMPOSITION EMPLOYING AN ENZYME MODIFIED CASEIN
Arthur L. Gordon, Des Plaines, and Samuel M. Weisberg, Wilmette, Ill., assignors to Kraftco Corporation, New York, N.Y., a corporation of Delaware
No Drawing. Filed Sept. 1, 1967, Ser. No. 667,063
Int. Cl. A61k 27/00, 19/00
U.S. Cl. 424—80                                              6 Claims

ABSTRACT OF THE DISCLOSURE

A composition and method of making same is provided which is suitable for cosmetic or pharmaceutical use. The composition contains casein which has been modified by subjecting the casein to treatment with a proteolyltic enzyme. The proteolytic enzyme hydrolyzes the casein into polypeptides, and other related protein fragments. The enzyme-modified casein may then be mixed with suspending, stabilizing and preservative agents, such as carrageenan, polyvinyl pyrrolidone and methyl parasept, to provide an improved composition for cosmetic or pharmaceutical use.

---

The present application generally relates to a composition for pharmaceutical or cosmetic use and more particularly relates to a composition with unique pharmaceutical and cosmetic properties and to a method for its preparation.

Various proteinaceous materials and compositions containing such materials have been proposed for pharmaceutical and cosmetic use. For example, the cosmetic industry has long been interested in producing a cosmetic product that is useful in camouflaging and minimizing the wrinkles associated with aging of the skin or with certain abnormal skin conditions, such as enlarged pores or visible scars. Prior art cosmetic compositions containing proteinaceous materials have been directed to provide a product that would be useful for such a purpose. Such prior art cosmetic compositions have not been wholly successful for various reasons. Allergenic reactions to the cosmetic preparation may occur with some individuals. The preparation may be difficult to apply, or it may lack smoothness or it may crack following application.

Compositions containing proteinaceous materials have also been used in the pharmaceutical industry for various purposes. Certain of these compositions have been used as dressings for wounds resulting from traumatic injury. Such prior art pharmaceutic compositions containing proteinaceous materials have not generally been substantially superior to known non-proteinaceous dressings.

Accordingly, it is an object of the present invention to provide an improved composition suitable for cosmetic or pharmaceutical use and a process for its preparation. It is another object of the invention to provide an improved composition containing proteinaceous materials suitable for use in concealing skin wrinkles. It is a further object of the present invention to provide an improved composition containing proteinaceous materials suitable for use as a dressing for wounds. These and other objects of the invention will be more clearly understood from a careful reading of the following detailed description of a process and product embodying various of the features of the invention.

In accordance with various of the features of the present invention, it has been found that a composition suitable for cosmetic or pharmaceutical use may be preparec dontaining casein which has been modified by enzymatic action. The enzyme-modified casein is prepared by adding a proteolytic enzyme to a caseinate dispersion. The resultant mixture is then digested for a time sufficient to effect a pre-selected level of hydrolysis of the casein into polypeptides and other related protein fragments. Enzyme digestion is then stopped by inactivating the enzyme following which the resultant suspension of enzyme-modified casein may be concentrated, dried, or used as is. The resultant enzyme-modified casein may then be mixed with suspension, stabilizing, and preservative agents to provide an improved composition for cosmetic or pharmaceutical use. The term "casein" refers to a phosphoprotein which is defined in The Merck Index, 7th edition 1960, p. 218. As defined therein, casein has the following typical analysis: C, 53.5%, H, 7.13%; N, 15.8%; O, 22.14%; P, 0.71%, and S, 0.72%.

The process for preparation of the enzyme-modified casein of this invention is related to the temperature at which the enzymatic digestion is effected before inactivation of the enzyme is completed.

In this connection, any temperature may be selected for the enzyme digestion between ambient temperatures and temperatures at which inactivation begins to occur. For any particular temperature the time required for the desired degree of digestion of the casein may be readily determined by one skilled in the art. The level of enzymatic digestion is specified in terms of the ratio between the protein nitrogen and the amino nitrogen of the casein. The enzymatic digestion may be accomplished at any temperature above about 60° F. up to the inactivation temperature of the enzyme for a period of time of between about 0.5 and about 60 minutes. It is preferred to use a reaction temperature of between about 110° F. and about 120° F. Within this range the desired level of hydrolysis of the casein by enzyme digestion may be accomplished in from about one to about thirty minutes before inactivation heating is initiated. For these preferred time-temperature conditions the ratio of protein nitrogen to amino nitrogen in the enzyme-modified casein is from about 20:1 to about 5:1.

The pH of the enzyme-modified casein may be controlled by varying the amount of base, such as an alkali metal hydroxide or carbonate, that issued to solubilize the casein. It is preferred that the pH of the enzyme-modified casein be from about 6.8 to about 8.9. In this connection, pH of the casein is determined by mixing enzyme-modified casein, which has been digested and dried, with distilled water at a level of 10 weight percent casein and determining the pH of the mixture.

The enzyme-modified casein of this invention may be distributed to the consumer in the form of a dry powder with instructions being provided to enable the consumer to reconstitute the enzyme-modified casein at the time of use into a sol suitable for external application to the skin. In this case, the dried enzyme-modified casein may be marketed as a cosmetic without added preservatives or stabilizers. However, for pharmaceutical use and for reasons of product appearance and ease of utilization, it is preferred to distribute the enzyme-modified casein of this invention in the form of a sol of the enzyme-modified casein in water.

The enzyme-modified casein sol may be preserved against bacteriological deterioration by pasteurization or sterilization. However, it is preferred to also provide a chemical preservative in the sol in suitable amounts. Preferred chemical preservatives are propyl chemosept and methyl parasept. These preservatives are used in amounts of from about 0.05 percent to about 0.2 percent by weight of the sol to inhibit any further bacterial activity after pasteurization or sterilization is effected.

It has been found that a sol of the enzyme-modified casein of this invention is unstable and the enzyme-modified casein will settle from the sol after standing for a few days. The sol, however, may be stabilized to prevent settling by adding small amounts of hydrocolloids thereto. Preferred hydrocolloids are carageenan, polyvinyl pyrrolidone (PVP), polyvinyl alcohol (PVA) and combinations thereof which may be added at levels of from about 1.0 percent to about 100 percent by weight of the enzyme-modified casein. Higher levels may be used but no substantial further improved stabilizing result is noted.

The addition of PVP to the sol also imparts a more desirable texture or lotion quality to the sol and aids in stabilizing the sol. The proportion of PVP to enzyme-modified casein may be from about 1:5 to about 1:1 by weight, a preferred proportion is about 1:2.6. The PVP may be any molecular size or combination of molecular sizes. Preferably the PVP is a high molecular weight PVP with a viscosity designation of 300 cs. for a 10 percent solution. The PVP may be added to the sol as a solution of PVP in water, or it may be added as a dry powder to the dried enzyme-modified casein. A preferred composition for cosmetic or pharmaceutical use comprises the enzyme modified casein of the invention at a level of from about 20 to about 95 weight percent, polyvinyl pyrrolidone at a level of from about 5 to about 50 weight percent and carrageenan at a level of from about 0.5 to about 5 weight percent, all percentages on a dry basis. The PVP preferably has a molecular weight of from about 10,000 to about 360,000.

The following examples are provided to illustrate specific processes and products embodying various features of the invention, but these examples are in no way intended to limit or restrict the scope of the inveniton.

EXAMPLE I

An enzyme-modified casein was prepared according to the following procedure. 150 grams of isoelectric casein, 185 ml. of water at 25° C., and 140 ml. of 1 N KOH were mixed thoroughly in a jacketed mixer for 5 minutes. The mixture was then allowed to stand for 15 minutes after which the mixture was warmed to 145° F. using steam heated water in the mixer jacket. The mixture was then cooled immediately to 115° F. and mixed for 30 minutes at this temperature.

A dispersion of 0.36 gram of a proteolytic enzyme in 25 ml. of water was then added to the soublized casein. The enzyme that was used is commercially available from Armour Corporation under the trade name "Enzar 1000." After 5 minutes of enzymatic reaction at 115° F., the enzyme was inactivated by heating the enzyme-casein mixture to 170° F. A time interval of 15 minutes was used in heating the mixture from 115° F. to 170° F., with the temperature after 5 minutes being 125 F., and after 10 minutes being 146° F. After 30 minutes at a temperature of 170° F. the enzyme- modified casein preparation was cooled to 140° F. and diluted with 100 ml. of distilled water to facilitate removal of the enzyme-modified casein from the mixer. The enzyme-modified casein was then frozen on stainless steel trays and freeze dried. After pulverizing the dried enzyme-modified casein with a mortar and pestle the sample was ready for use as a cosmetic product. The pH of the dried enzyme-modified casein when reconstituted with water at a level of 10 weight percent enzyme-modified casein was 6.9 and the ratio of protein nitrogen to amino nitrogen was 11:1 as determined by the method described in Dunn and Loshakog, J. Biol. Chem. 113:359 (1936).

EXAMPLE II

A sample of enzyme-modified casein was prepared according to the procedure of Example I, except that the enzyme was added to the casein mixture when the mixture was at a temperature of 100° F. The enzyme was allowed to react for a period of 15 minutes before inactivation heating was initiated. The pH of the dried casein when reconstituted with water was 7.2. The modified casein of this example was substantially identical to that of Example I in that the ratio of protein nitrogen to amino nitrogen was 10.5:1.

EXAMPLE III

A bulk lot of enzyme-modified casein was prepared according to the following procedure: 85 lbs. of isoelectric casein, 203 lbs. of water at 72° F., and 5 lbs. of an 85-percent pure KOH were added to a suitable stainless-steel, jacketed tank and mixed for 5 minutes. The caseinate suspension was allowed to stand for 15 minutes after which it was warmed to 145° F., using jacket heat. After cooling to 115° F., 206 gms. of Wilson's Trypsin enzyme 1:130 was dispersed in 1 liter of water and added. After a period of 5 minutes, heating was initiated and the temperature was raised to 170° F. and held at that temperature for 30 minutes to inactivate the enzyme. The slurry was cooled and spray dried. The pH of the product was 8.9 and the ratio of total nitrogen to amino nitrogen was 18:1.

EXAMPLE IV

Stabilized sols of the enzyme-modified casein of Examples I, II and III were prepared according to Table 1 below. In preparing the sols the PVP when used was added to the water as a 20 weight percent solution. All components except casein were first combined and heated to 140° F. before the casein was added. The resultant mixture was stirred for 10 minutes and then bottled.

TABLE 1

| | Enzyme-modified casein, gms. | PVP, gms. solid | Carrageenan, gms. | Water, gms. | Preservative, gms., type* |
|---|---|---|---|---|---|
| Sample No.: | | | | | |
| 1 | 6.6 | 1.3 | | 66.7 | .04 PC |
| 2 | 4.8 | 3.2 | | 59.2 | .04 PC |
| 3 | 1.37 | .53 | .1 | 18 | .04 MP |
| 4 | 1.38 | .54 | .075 | 18 | .04 MP |
| 5 | 1.40 | .55 | .05 | 18 | .04 MP |
| 6 | 1.40 | .56 | | 18 | .04 MP |
| 7 | 1.40 | | | 18 | .04 MP |
| 8 | 1.40 | | .1 | 18 | .04 MP |
| 9 | 1.40 | | .05 | 18 | .04 MP |

*PC=propyl chemosept; MP=methyl parasept.

It was noted that Samples 1, 2 and 6 in which PVP was used without carrageenan, delayed settling of the casein for a period of two to three days, while Sample No. 7 containing no PVP and no carrageenan settled within 24 hours. The carrageenan stabilized Samples 3, 4, 5, 8 and 9 were stabilized indefinitely. The PVP-carrageenan samples were noted to have a creamy, pleasant, opalescent texture that was lacking in the other samples. A slight amount of gelling was also noted in these samples, after setting for an extended period of time. If a gelled product is considered detrimental, suitable anti-gelling agents may be added to the formulation to maintain a lotion texture. Anti-gelling agents include hydrogen-bond breakers, such as potassium or sodium thiocyanate, and compounds that react with free amino groups, such as aldehydes (benzaldehyde, formaldehyde, paraformaldehyde, and sodium formaldehyde sulfoxylate) and cysteine hydrochloride. For example, the formulation of Sample 5 was modified by adding various amounts of potassium thiocyanate, to provide Samples 10–13, as shown in Table 2.

TABLE 2

| Enzyme-modified casein, PVP, carrageenan, preservative | Potassium thiocyanate, gms. |
|---|---|
| Example No.: | |
| 10 Same as Sample 5 | 0.025 |
| 11 do | 0.05 |
| 12 do | 0.075 |
| 13 do | 0.100 |

These samples were observed at intervals of one week for a period of six months. Sample No. 10 showed a slight amount of gelling after five weeks. No settling or gelling was observed in Samples 11–13 after six months' storage.

EXAMPLE V

Samples 1, 2, 3 and 4 were evaluated to determine their effectiveness in concealing facial wrinkles. The modified casein preparations were applied to brow wrinkles and "crow's feet" under the eyes of 2 female volunteers and one male. All samples were noted to be effective in concealing the facial wrinkles for a period of time extending up to 10 hours.

EXAMPLE VI

The enzyme-modified casein from Example III was used to prepare the compositions of the following Table 3.

TABLE 3

| Sample No.: | Enzyme-modified casein weight percent (dry basis) | Polyvinyl Pyrrolidone | | Carrageenan weight percent (dry basis) |
|---|---|---|---|---|
| | | Molecular weight | Weight percent (dry basis) | |
| 14 | 65.15 | 40,000 | 19.40 | 2.45 |
| | | 360,000 | 13.00 | |
| 15 | 70.23 | 360,000 | 27.30 | 2.47 |

The above compositions were made into stabilized sols in accordance with the following method:

Distilled water was boiled for approximately 30 minutes, after which it was cooled to 130–135° F. To 180 ml. of water was added 0.4 gm. methyl parasept which slowly dissolved as the temperature gradually dropped to 120° F.

Two vials 4¼ inches long and approximately one inch in diameter were sterilized by boiling in distilled water for ½ hour. To each vial was added 35 ml. boiled water containing the methyl parasept and 2.8 gms. of the composition of Samples 14 and 15, respectively.

Each vial was sealed with a cap and shaken for one minute, at which point the caps were removed to free any product lodged at the top. An additional ½ minute shaking dispersed all the dry powder into a uniform sol.

A water bath was heated to 195° F. and the vials were placed in the bath. The resulting level of water was below the surface of the tops of the caps. The bath temperature dropped to 185° F. and was maintained at a temperature of 185–186° F. for 10 minutes. During the heating period (after 5–7 minutes) each sample was shaken gently 4–5 times to further mix and equilibrate the temperature of the solutions. The preparations were allowed to cool by exposing them to room temperature for approximately 15 minutes to 120° F. During the cooling process, each sample was gently shaken 2–3 times.

The above sols of Samples 14 and 15 were then used as a dressing for traumatic injuries induced in four guinea pigs. Traumatic injuries were induced in two additional guinea pigs which were treated with a control dressing of tincture of zephiran chloride.

The traumatic injuries were induced in each of the six guinea pigs by similar midline incisions made through the abdominal epithelial layers of the guinea pigs after usual preparations for aseptic surgical procedure. Care was taken that the incision was carried out in the same manner to provide an incision approximately 5 centimeters in length.

At the time of the incision, the above-described stabilized sols and control were each topically applied to the denuded tissue surfaces of two of the guinea pigs. The skin surfaces were then brought into opposition and small (11 mm.) nickel-silver Michel wound clips were applied. Thereafter topical applications of the appropriate dressing were made twice daily to the surfaces of the incisions and continued for a total of four days.

After fourteen days the guinea pigs were sacrificed and the entire length of the incision was removed. After embedding in tissue mat, cross sections were made and stained by a standard hemotoxylin-cosin technique. Other cross sections were prepared and stained by a Masson-trichrome stain technique. The stained cross sections were then evaluated for indications of collagen formation and epithelial cell regeneration.

After traumatic injury a final healed state is achieved by the development of a connective tissue scar followed by regeneration of the injured and destroyed cells. The connective tissue cells which are involved in the repairative process are the fibrocytes which lay down collagen networks. There is a proliferation of young connective tissue cells (fibroblasts) and a multiplication of small blood vessels by mitotic division of connective tissue and endothelial cells. The elongated fibroblasts produce a vascularized reddish mass termed granulation tissue. The granulation tissue fills up gaps in the tissue. The healing of a clean, uninfected incision in which there is little destruction of tissue and where the edges of the incision are held in apposition occurs with a minimum of granulation and scar tissue. If there is much loss of tissue or infection, the healing process is delayed due to need for providing an increased amount of granulation tissue and greater scarring results.

In the guinea pigs which had been treated with the composition of the present invention there was a decreased level of formation of granulation tissue and consequent lessening of scarring over those guinea pigs treated with the control dressing. In addition, observation of the guinea pigs after four days indicated that the healing rate of the guinea pigs treated with proteinaceous compositions was increased.

Accordingly, a product and a process have been provided for unique proteinaceous compositions that are suitable for pharamaceutical or cosmetic use. It will be understood that various changes and modifications may be made in the specific examples recited herein without departing from the spirit and scope of the present invention.

Various features of the present invention are set forth in the following claims.

What is claimed is:

1. A composition for pharmaceutical use comprising casein, polyvinyl pyrrolidone and carrageenan, said casein having been hydroylzed by enzyme digestion to provide a weight ratio of protein nitrogen to amino nitrogen in the range of from about 5:1 to about 20:1, said casein being present at a level of from about 20 to about 95 weight percent of said composition on a dry basis, and said polyvinyl pyrrolidone and said carrageenan being present at a level of from about 1 to about 100 percent by weight of said casein on a dry basis, said polyvinyl pyrrolidone having a molecular weight of from about 10,000 to about 360,000.

2. The composition of claim 1 wherein said polyvinyl pyrrolidone is from about 5 to about 50 weight percent of said composition on a dry basis.

3. The composition of claim 1 wherein said carrageenan is from about 0.5 to about 5 weight percent of said composition on a dry basis.

4. A method for treating wounds resulting from traumatic injury, comprising applying to the wound an aqueous dispersion of a composition comprising casein, polyvinyl pyrrolidone and carrageenan, said casein having been hydrolyzed to an extent sufficient to provide a weight ratio of protein nitrogen to amine nitrogen in the range of from about 5:1 to about 20:1 by the steps of forming an aqueous suspension of casein, adding a proteolytic enzyme to said suspension, effecting hydrolysis of said casein within said range and inactivating said enzyme after said hydrolysis by heating said casein suspension above the inactivation temperature of said enzyme, said casein being present at a level of from about 20 to about 95 weight percent of said composition on a dry basis, said polyvinyl pyrrolidone and said carrageenan being present at a level of from about 1 to about 100 percent by weight of said casein on a dry basis, said polyvinyl pyrrolidone having a molecular weight of from about 10,000 to about 360,000.

5. The method of claim 4 wherein said polyvinyl pyrrolidone is from about 5 to about 50 weight percent of said casein dispersion on a dry basis.

6. A method in accordance with claim 4 wherein said carrageenan is from about 0.5 to about 5 weight percent of said casein dispersion on a dry basis.

References Cited

UNITED STATES PATENTS

| | | | |
|---|---|---|---|
| 3,001,876 | 9/1961 | Loewenstein | 99—20 |
| 3,036,918 | 5/1962 | Wingerd et al. | 99—20 |
| 3,186,918 | 6/1965 | Salzberg et al. | 195—4 |
| 3,364,118 | 1/1968 | Howard et al. | 424—177 |

OTHER REFERENCES

Thomsen "Am Perfumes & Cosmetics" vol. 78, No. 10, 1963 pp. 45–50, Stoloff, "Industrial gums" Edited by Whistler, Roy, ch. 5 pp. 83, 110 (1959).

ALBERT T. MEYERS, Primary Examiner

V. D. TURNER, Assistant Examiner

U.S. Cl. X.R.

424—177